US012712929B1

(12) United States Patent
Gad et al.

(10) Patent No.: US 12,712,929 B1
(45) Date of Patent: Aug. 18, 2026

(54) SUB-GROUP CHATS IN CONFERENCES

(71) Applicant: Zoom Communications, Inc., San Jose, CA (US)

(72) Inventors: Mohamed Yosry Elsayed Mohamed Gad, San Francisco, CA (US); Wei Ning, Hangzhou (CN); Maggie Zheng, Chicago, IL (US)

(73) Assignee: Zoom Communications, Inc., San Jose, CA (US)

( * ) Notice: Subject to any disclaimer, the term of this patent is extended or adjusted under 35 U.S.C. 154(b) by 72 days.

(21) Appl. No.: 18/651,217

(22) Filed: Apr. 30, 2024

(51) Int. Cl.
*H04L 65/401* (2022.01)
*H04L 12/18* (2006.01)

(52) U.S. Cl.
CPC ........ *H04L 65/401* (2022.05); *H04L 12/1813* (2013.01); *H04L 12/1822* (2013.01); *H04L 12/1831* (2013.01)

(58) Field of Classification Search
USPC .......................................................... 709/204
See application file for complete search history.

(56) References Cited

U.S. PATENT DOCUMENTS 6,381,640 B1 * 4/2002 Beck ....................... G06F 16/40 709/200
7,756,537 B2 7/2010 Laurila et al.
9,769,319 B1 * 9/2017 Chavez ................. H04M 3/567
10,335,691 B2 7/2019 Sullivan et al.
10,708,322 B1 * 7/2020 Carlson ................... H04L 51/58
11,863,335 B1 1/2024 Clark et al.
2001/0025309 A1 * 9/2001 Macleod Beck ..... G06F 40/279 455/554.1
2013/0066974 A1 * 3/2013 Yoakum .............. H04L 12/1827 709/205
2014/0089822 A1 * 3/2014 Wu ..................... G06F 3/04817 715/761
2014/0226537 A1 * 8/2014 Kashimba ........... H04L 65/4038 370/261
2014/0258416 A1 * 9/2014 Kurupacheril ...... H04L 65/4025 709/205
2017/0134456 A1 * 5/2017 McDonnell ........... H04L 65/611
2021/0409462 A1 * 12/2021 Dusad ................... H04L 65/403
2022/0200947 A1 6/2022 Guerrieri et al.
2022/0239711 A1 * 7/2022 Kulkarni ............. H04L 65/4015
2022/0321373 A1 * 10/2022 Lin ..................... H04L 12/1822
2023/0054044 A1 * 2/2023 Abraham ............ H04L 65/1083
2023/0101151 A1 * 3/2023 van Rensburg ..... G06F 3/04817 715/753
2023/0101377 A1 * 3/2023 Lin ........................ H04N 7/157 348/14.09

(Continued)

FOREIGN PATENT DOCUMENTS

CN 115292482 A * 11/2022 ............. G06F 16/35

*Primary Examiner* — Phyllis A Book
(74) *Attorney, Agent, or Firm* — Young Basile Hanlon & MacFarlane, P.C.

(57) ABSTRACT

A conferencing software may receive a command to generate a chat group for a conference that includes a subset of conference participants of the conference. The conferencing software generates the chat group for the conference. The conferencing software receives a chat message to transmit to the subset of the conference participants. The conferencing software transmits the chat message to each of the subset of the conference participants.

20 Claims, 9 Drawing Sheets

(56) References Cited

U.S. PATENT DOCUMENTS

2023/0137043 A1* 5/2023 Swerdlow ........... H04L 12/1822
709/204
2023/0247028 A1* 8/2023 Madaan ................ H04L 51/216
726/4
2024/0015194 A1 1/2024 Bernabe et al.

* cited by examiner

SUB-GROUP CHATS IN CONFERENCES

FIELD

This disclosure generally relates to conference management, and, more specifically, to enabling sub-group chats in audiovisual conferences.

BRIEF DESCRIPTION OF THE DRAWINGS

This disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
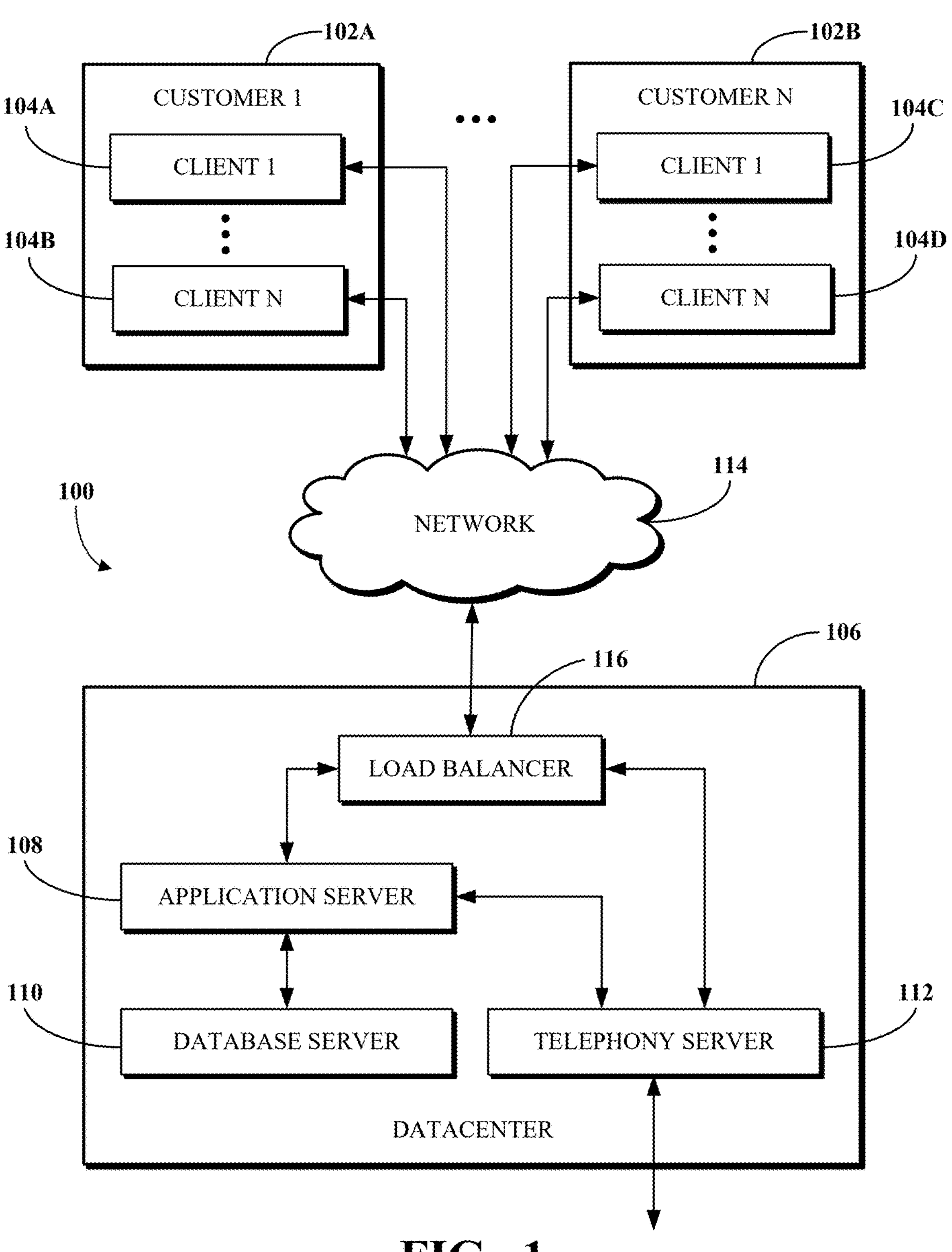
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conventional conferencing software may enable a chat capability in conferences. For example, a conferencing user interface associated with a conference may be configured to enable conference participants to chat. A chat, in this context, refers to the exchange of asynchronous, text-based messages between participants, delivered in real-time during the conference. The conferencing software typically features a chat window, integrated within the conferencing user interface, where a conference participant can select to initiate a text-based communication during the conference. However, such text-based communication options are limited to either being with the entire group of participants attending the conference or an individual participant (i.e., for a private conversation, also referred to as direct messaging (DM).

This conventional (e.g., binary) approach to chat functionality in conferences thus has at least the following significant limitations. It fails to allow communication with a specific subset of conference participants, instead notifying everyone when a message intended for only some participants is sent, causing unnecessary distractions to the other participants. Secondly, it burdens a participant who wants to communicate with only a subset of the conference participants with a heavy cognitive load when they need to discuss secondary topics, not appropriate for all conference participants, or coordinate privately.

To illustrate using a non-limiting scenario, an executive and a support team (from the marketing and legal teams) may be meeting with 20 others from a prospective client using a video conference. To consult with the support team, using the chat functionality associated with the conference, the executive must resort to inefficient methods such as sending multiple private messages (e.g., a message to each member of the support team) or using a separate application for communication (such as email or a chat application that is separate from the conferencing application), both of which are cumbersome and interruptive to the conference experience.

Implementations of this disclosure address problems such as these by enabling sub-group chats in conferences. A conferencing software according to this disclosure includes technical capabilities that enable a conference participant to communicate, in addition to the binary options, with subsets of the conference participants. Conference participants can have chat conversations with a selected subset of conference participants. Sub-group chats in conferences provides a visually distinctive mechanism to differentiate between one-on-one conversations and group chats, enhancing user experience by facilitating private, focused discussions without leaving the meeting platform. By merging the flexibility of group messaging with the real-time context of meetings, sub-group chats in conferences reduce cognitive load, improves communication efficiency, and fosters more productive interactions among participants.

During a conference, sub-group chats in conferences provides functionality that enables a participant to create a chat group that includes a subset of the conference participants, add or remove participants, and rename the group chat. A group chat can be for temporary use within the duration of the conference, with options for extending the conversation post-meeting through a capability referred to herein as continuous meeting chat (CMC).

In some implementations, a conferencing software may receive a command to generate a chat group for a conference that includes a subset of conference participants of the conference. The conferencing software generates the chat group for the conference. The conferencing software receives a chat message to transmit to the subset of the conference participants. The conferencing software transmits the chat message to each of the subset of the conference participants.

To describe some implementations in greater detail, reference is first made to examples of hardware and software structures used to implement a system for enabling sub-chat groups in conferences. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
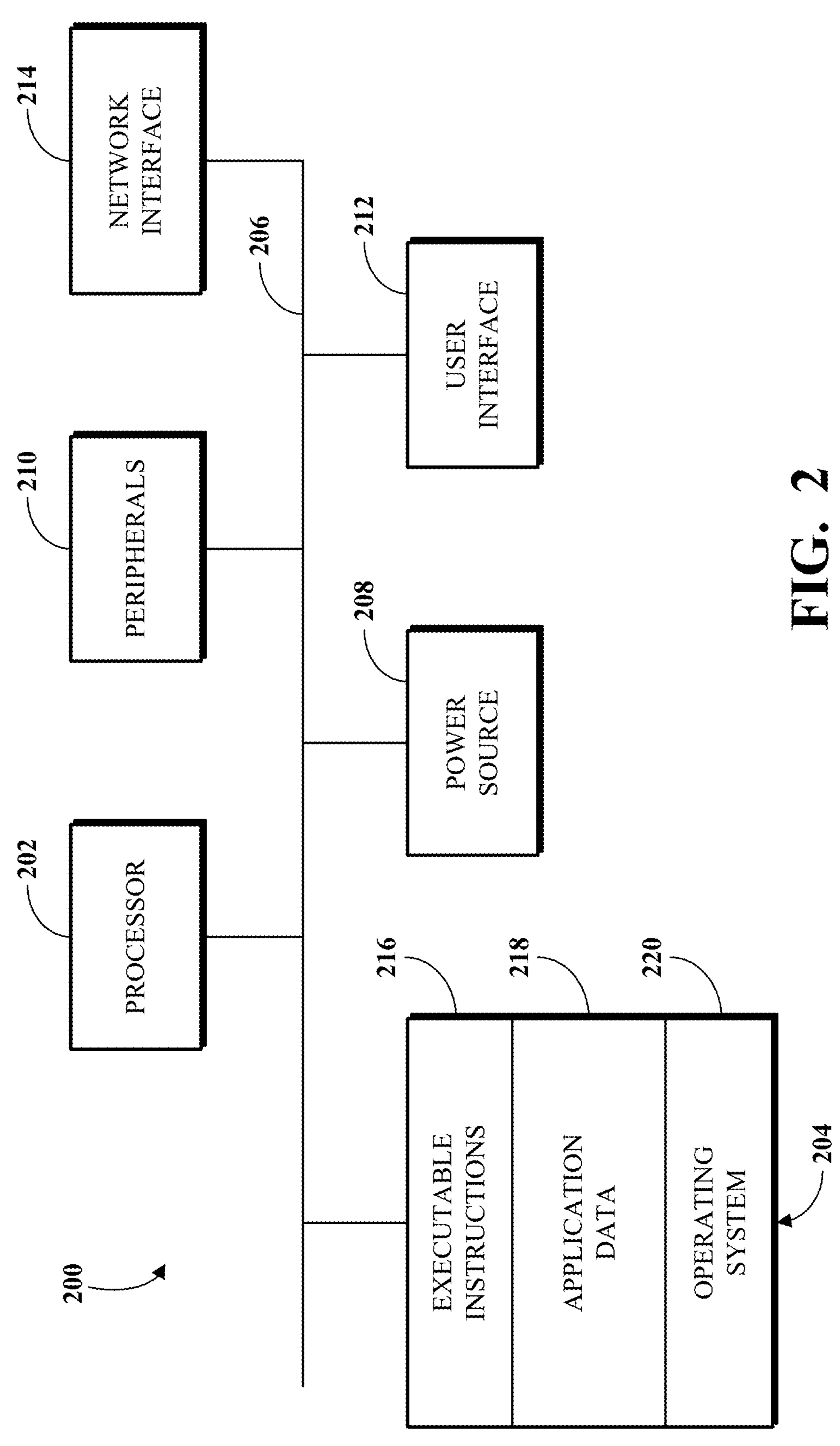
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
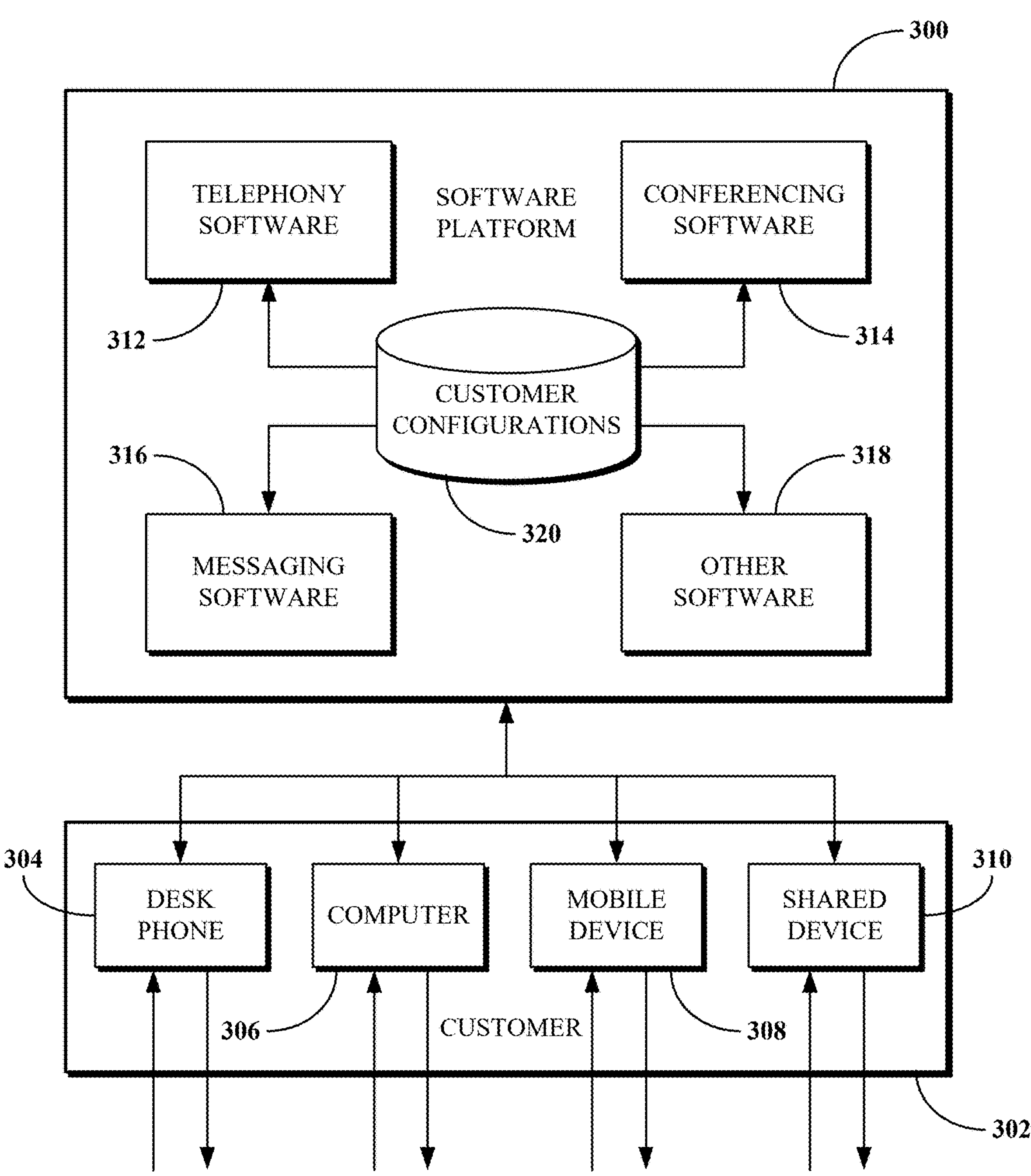
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for enabling sub-chat groups in conferences. In some such cases, the conferencing software 314 can include the other software 318 or the other software 318 can otherwise represent functionality of the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
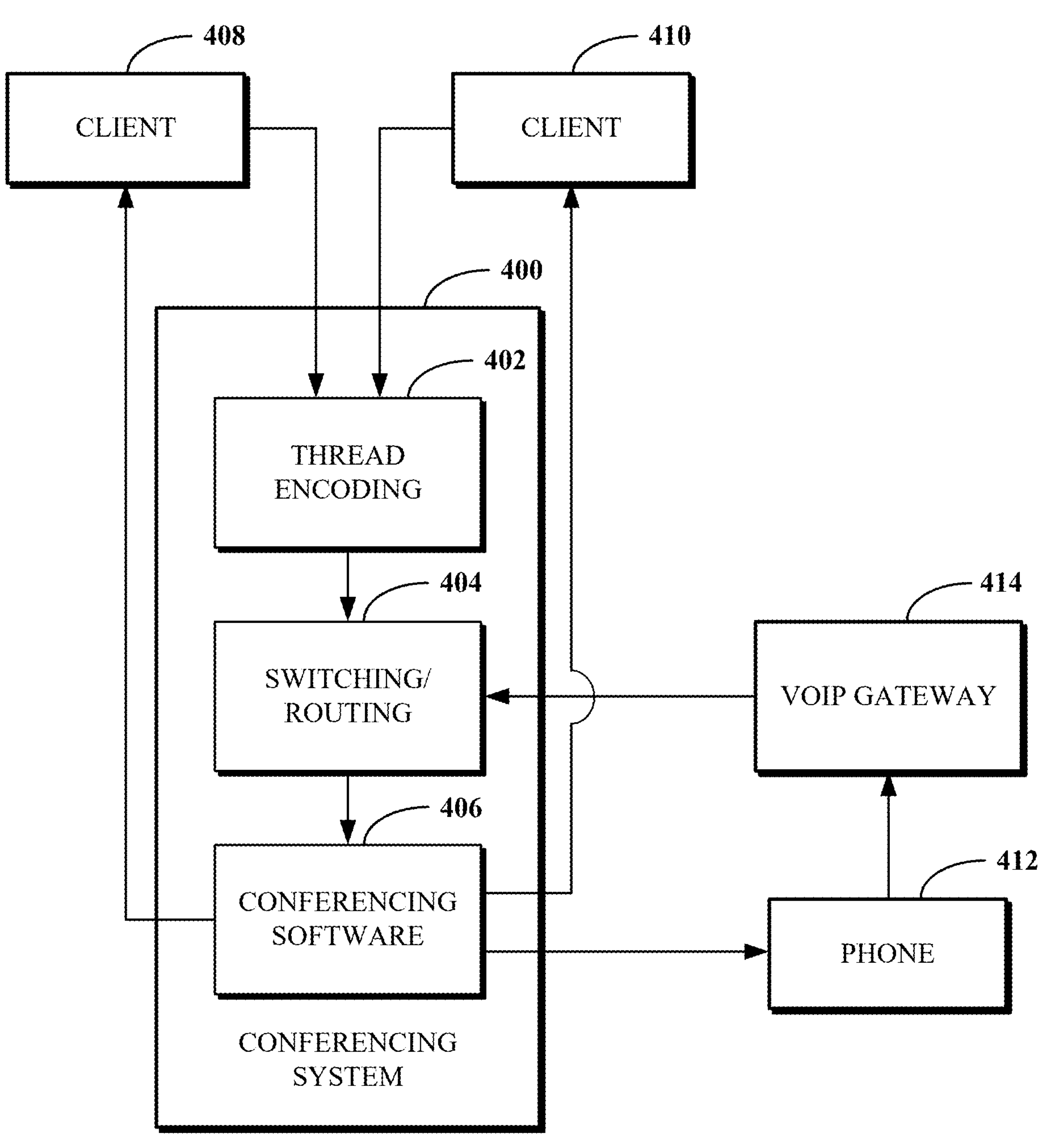
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to as an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
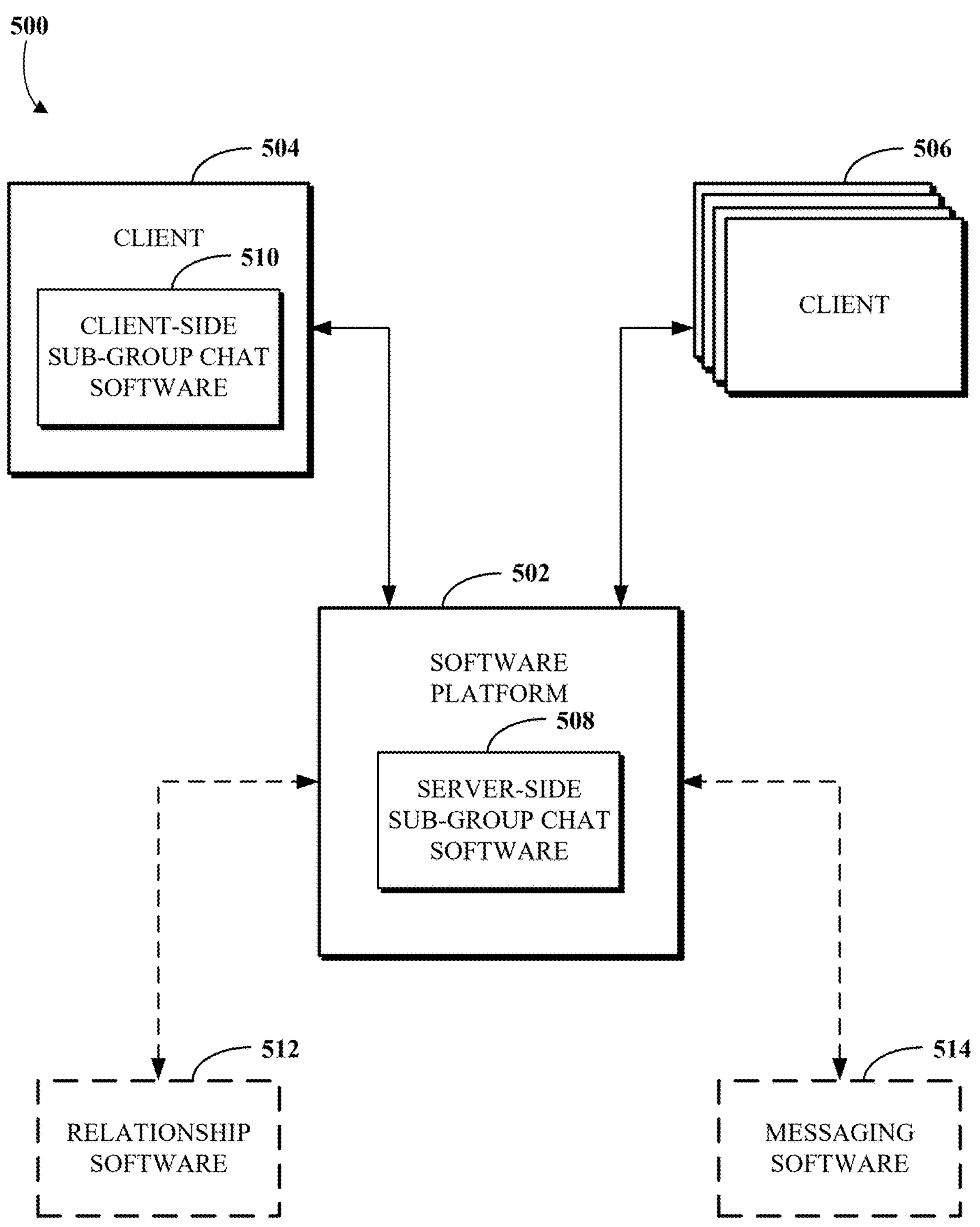
FIG. 5 is a block diagram of an example of a system for enabling sub-group chats in conferences.

FIG. 5 is a block diagram of an example of a system 500 for enabling sub-group chats in conferences. The system 500 is shown as including a software platform 502, a client 504, and two or more other clients 506. FIG. 5 illustrates that the client 504 and the two or more other clients 506 are connected to a conference (not explicitly shown) that is hosted or facilitated by the software platform 502. Other numbers of clients can be connected to the conference and the software platform 502 may be capable of simultaneously hosting many conferences. The software platform 502 can be the software platform 300 of FIG. 3. As such, the software platform 502 may include at least a conferencing software, such as the conferencing software 314, and may include a messaging software, such as the messaging software 316.

The software platform 502 may be configured to orchestrate the overall communication, data exchanges, data storage, and/or data creation related to sub-group chat groups via a server-side sub-group chat software 508. For example, the server-side sub-group chat software 508 may receive a request from the client-side sub-group chat software 510 to create a chat group in association with a conference. The request may include a topic or title for the chat group and may include one or more members to add to the sub-group chat. In response to the request, the server-side sub-group chat software 508 creates, such as in a data store (not shown)

data (e.g., data structures or objects) necessary to represent the sub-group, its membership, and messages exchanged therethrough. Throughout the conference, the server-side sub-group chat software 508 may receive messages from devices of members of the group, which it transmits to the other group members (e.g., to the devices associated therewith).

The client 504, representing a conferencing participant's device within the conference, is equipped with client-side sub-group chat software 510, which facilitates the conference participant associated with the client 504 to initiate and manage sub-group chats within the conference, thereby allowing for targeted discussions without broadcasting to all conference participants. As such, the client-side sub-group chat software 510 presents chat groups associated with subgroups of the conference participants in a conferencing user interface associated with the conference and enables the conference participant to create and/or interact with (e.g., post to and read messages from the chat groups via the conferencing user interface.

A "chat group," as used herein, refers to a virtual pathway or space within a conference dedicated mainly to real-time text-based conversation among the conference participants associated with the chat group. A chat group allows a subset of conference participants to engage in separate, simultaneous discussions without interrupting the main conference feed (e.g., a default, pre-configured chat group that includes all conference participants). As such, and for ease of reference, a chat group refers to conference participants constituting the membership of the chat group as well as the set of messages exchanged therethrough. As further described herein, in addition to sub-group chat groups, the system 500 also enables broadcast chat messages (e.g., chat messages with all conference participants) and DMs.

The client 504 and each of the two or more other clients 506 can be or can be similar to the client 408 or 410 of FIG. 4. At least some of the two or more other clients 506 can include a respective client-side sub-group chat software 510.

The system 500 may include or integrate a relationship software 512, which stores data related to the hierarchical or relational structures of employees, teams, entities, or the like. The system 500 may use (e.g., interrogate, query, or otherwise leverage) the relationship data to perform bulk actions such as the formation of sub-groups based on organizational roles or departmental affiliations directly from the client 504. Such an integration simplifies the process of grouping participants into relevant sub-chat groups, optimizing the time required for group formation. Use of relationship data is further illustrated with respect to FIG. 7B.

The relationship software 512 may be or may operate akin to a Human Resources Management System (HRMS) or a Lightweight Directory Access Protocol (LDAP) directory. In an example, the relationship software 512 may be included in the software platform 502. As such, the relationship software 512 can be included in the other software 318 of FIG. 3. That is, relationship data may be included in the software platform 502. The relationship software 512 may maintain a data store of organizational structures, job titles, reporting lines, and group memberships. The data store can be synchronized with an external HR system or active directory to reflect real-time changes within the organization. The relationship data can be used to perform complex operations relating to sub-group chat creation such as automatically identifying relationships amongst subsets of conference participants or identifying conference participants based on provided criteria therewith reducing the cognitive load on participants during group formation.

At (e.g., after) the conclusion of a conference, such as when the conference ends and no more conference participants remain joined to the conference, the server-side sub-group chat software 508 may terminate (e.g., close or delete) the chat group. That is, it would not be possible to continue to have text messages exchanged using the group after the conclusion of the conference. However, in some situations, it may be desirable to maintain the continuity of a conversation (e.g., a chat group conversation thread) after a conference has concluded. A chat group that is configured to continue beyond the conclusion of the conference is referred to herein as a CMC. A CMC enables conference participants to carry on their subgroup discussions in a dedicated chat space that persists beyond the time-bound framework of the initial meeting.

The CMC may be continued within a messaging software 514, which may be separate (e.g., may operate separately) from the conferencing software. In an example, the messaging software 514 may be part of the software platform 502. For example, the messaging software 514 can be the messaging software 316 of FIG. 3. In another example, the conference participants of the sub-group chat may use a messaging software 514 that is separate from the software platform 502. To illustrate, and without limitations, the messaging software 514 may be or may be analogous to applications such as the Slack®, Microsoft® Teams®, or other enterprise messaging systems. The server-side sub-group chat software 508 can use Application Programming Interfaces (APIs) of the messaging software 514 to cause a chat channel corresponding to the sub-group chat, including its membership and content (e.g., messages exchanged therein) to be created in the messaging software 514. As such, the sub-group chat's membership can be mirrored in, and its content (which includes the history of messages exchanged during the meeting) is transferred to the messaging software 514.

Figure 6B:
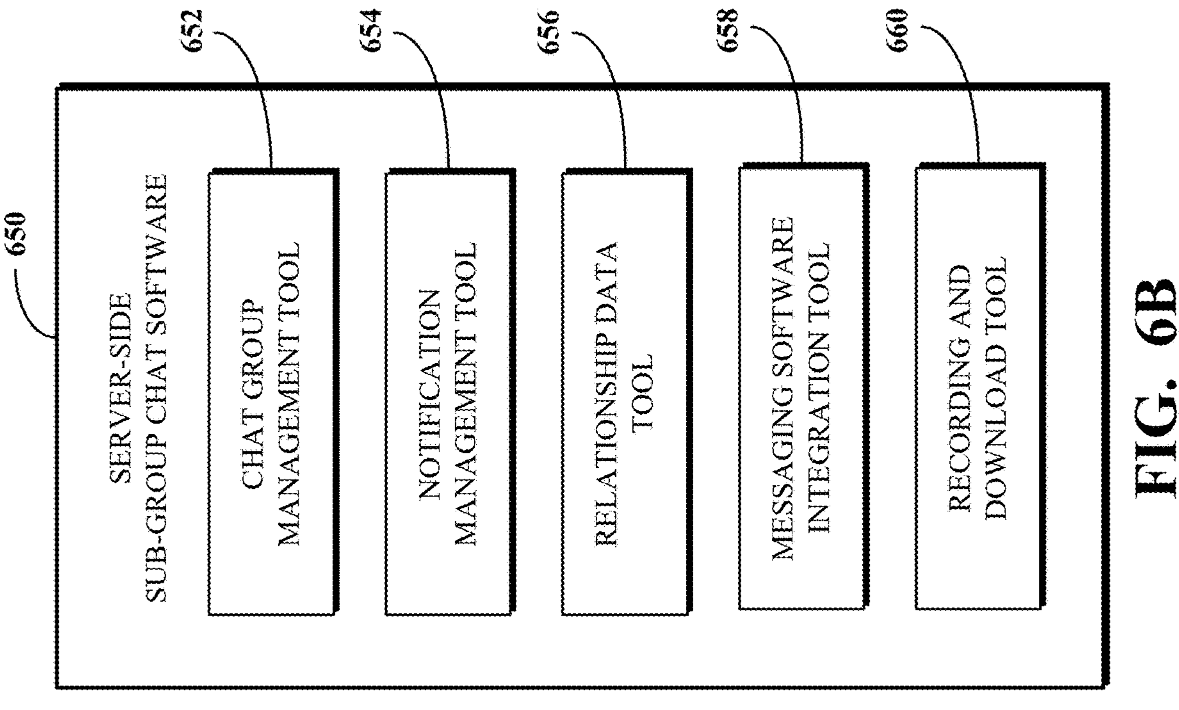
FIG. 6B is a block diagram of an example of functionality of server-side sub-group chat software.
Figure 6A:
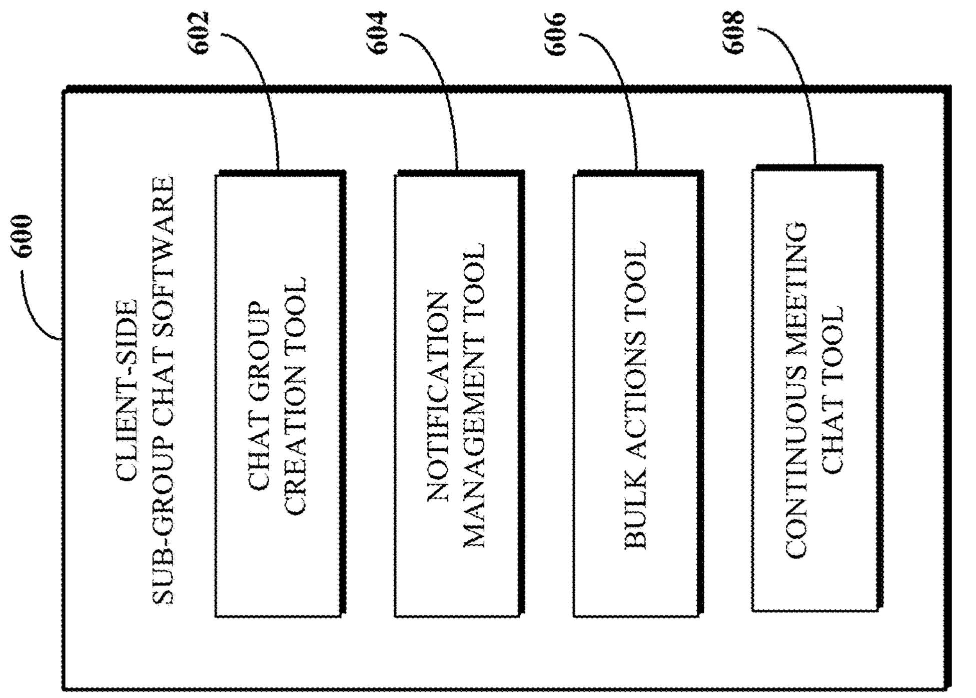
FIG. 6A is a block diagram of an example of functionality of client-side sub-group chat software.

FIG. 6A is a block diagram of an example of functionality of client-side sub-group chat software 600 that may be included in a user device, such as the client 504 or one of the two or more other clients 506; and FIG. 6B is a block diagram of an example of functionality of server-side sub-group chat software 650 that may be included in a server device or a software platform. As such, the client-side sub-group chat software 600 can be the client-side sub-group chat software 510 shown in FIG. 5; and the server-side sub-group chat software 650 can be the server-side sub-group chat software 508 shown in FIG. 5.

The functionalities associated with the client-side sub-group chat software 600 and the server-side sub-group chat software 650 describe a flexible framework designed to enhance user interaction and communication efficiency within a digital conferencing environment. The distribution of functions between the client-side sub-group chat software 600 and the server-side sub-group chat software 650 can be an implementation detail that is different from that described herein. Implementations according to this disclosure are not limited to or by the distribution of functionalities described herein. For instance, a variety of implementation strategies is contemplated where certain capabilities might be partially handled (e.g., performed or implemented) by the client-side sub-group chat software 600, such as those relating to the user interface and direct user interactions, while the non-user interface aspects and data processing tasks might be more effectively managed by the server-side sub-group chat software 650. Examples of such collaborative implementations could include the management of chat group memberships, the handling of message notifications, and the synchronization of chat histories across devices, which may leverage both the client-side sub-group chat software 600 and the server-side sub-group chat software 650 to optimize performance and user experience.

Referring to FIG. 6A, the client-side sub-group chat software 600 includes tools, such as programs, subprograms, functions, routines, subroutines, operations, and/or the like for enabling sub-group chats in conferences. As shown, the client-side sub-group chat software 600 includes a chat group creation tool 602, a notification management tool 604, a bulk actions tool 606, and a CMC tool 608.

The chat group creation tool 602 provides functionality for initiating (e.g., creating, setting up, or configuring) new sub-group chats by facilitating the selection of conference participants of an ongoing conference. The chat group creation tool 602 may provide a user interface that displays a list of the conference participants enabling the conference participant to identify (e.g., search for or select) conference participants by name, role, or based on other criteria for inclusion in a chat group. The chat group creation tool 602 may enable the conference participant to associate an identifier (such as a name, a topic, or a purpose) with the chat group.

The chat group creation tool 602 also enables the modification of the chat group membership post-creation. That is, the conference participant can add conference participants to and remove conference participants from the chat group after the creation of the chat group. In an example, after the chat group is created, any member of the chat group may be granted permission, such as by the chat group creator, to modify the membership of the chat group. In an example, the creator of the chat group may not be removable from the chat group. That is, the creator can be designated as a permanent member who cannot be removed. In an example, only the creator of the chat group can modify the membership of the group.

The chat group creation tool 602 can enable a conference participant to add invited but not yet joined conference participants to a chat group. That is, a prospective conference participant does not need to be actively participating in the conference at the time of creation of the chat group creation and can be added preemptively, ensuring they are incorporated into the conversation upon joining the conference. As such, upon joining the conference, the prospective conference participant is able to review all the messages posted in the chat group prior to them joining the conference.

The chat group creation tool 602 interfaces (e.g., transmits requests to) a server-side sub-group chat software, such as the server-side sub-group chat software 508 of FIG. 5 or the server-side sub-group chat software 650 of FIG. 6B, to create and maintain the chat group.

The notification management tool 604 is configured to handle incoming messages and to transmit outgoing messages. When a message is received from the server-side sub-group chat software, the notification management tool 604 updates the corresponding chat group to reflect the new message by providing a real-time notification of the message. An incoming message includes the chat group with which it is associated. Upon receipt of a message, whether text or media, the notification management tool 604 may update a visual indicator, such as a counter associated with an identifier of the chat group, signaling the presence of a new, unread message. The counter provides a quick reference to identify active discussions and prioritize attention accordingly.

When the conference participant selects a chat group, the notification management tool 604 resets the counter, thereby reflecting the fact that the messages have at least been seen by the conference participant. This mechanism helps in managing the user's focus, preventing the accumulation of notifications, and reducing the cognitive load on the conference participant navigating through multiple chat groups.

Additionally, the notification management tool 604 transmits messages to the server-side sub-group chat software. This includes the sending of text messages and the handling (e.g., transmission) of media messages, such as images, documents, or any file attachments. For example, the conference participant may drag and drop a file onto a chat group for transmission to all members of that chat group.

The notification management tool 604 may be configured to include functionality for monitoring and conveying the read or interaction status of messages within any chat channel. Such capability allows for a more informed communication strategy among participants of a chat group, ensuring that information dissemination is acknowledged and tracked, thereby fostering a more efficient and responsive collaborative environment.

When a conference participant interacts with (e.g., clicks on, opens, navigates to) a chat group that contains unread messages, the notification management tool 604 communicates with the server-side sub-group chat software to mark these messages as read. As such, it will be possible to inform members of a chat group of other members who have yet to interact with unread messages in that chat group. That is, the notification management tool 604 enables the conference participant to identify which members of the chat group have unread messages. The conference participant may invoke a status-check action available in the conferencing user interface. In response to the invocation, the notification management tool 604 transmits a request to the server-side sub-group chat software 650 to obtain at least a list of those chat group members who have unread messages. The notification management tool 604 in turn provides a display of these members to the conference participant.

The bulk actions tool 606 enables users to perform group-related actions en masse, such as adding multiple participants to a sub-group chat at once. The bulk actions tool 606 enables the rapid assembly of chat groups during a conference. This not only expedites the formation of discussion groups but also ensures that all pertinent stakeholders are included in relevant conversations, thereby enhancing collaboration and information dissemination. To illustrate, and without limitations, the conference participant can utilize the bulk actions tool 606 to create a chat group that includes "all members of my team," "all my peers" within a department," "all from my company" attending the conference, "all Neptune project members," or "all LA team members."

The bulk actions tool 606 may interface with a relationship software, which may be as described with respect to the relationship software 512 of FIG. 5, to fetch and utilize relationship data. This integration streamlines the formation of chat groups by enabling automated groupings according to factors like organizational roles, project teams, and geographic or departmental divisions. By leveraging relationship data, the bulk actions tool 606 can automatically identify and include relevant participants based on predefined criteria, such as project teams, departmental peers, or company-wide members, without the need for manual selection.

In an implementation, the server-side sub-group chat software 650 may implement the integration with the relationship software. As such, the bulk actions tool 606 with interact with the server-side sub-group chat software to identify the conference participants that meet the specified criteria. In response to a request for conference participants that meet a certain criterion, the server-side sub-group chat software 650 returns to the bulk actions tool 606 the list of the conference participant that meet the criterion.

The CMC tool 608 facilitates the seamless transition of sub-group chats to continuous meeting chats, allowing conversations to persist post-meeting. The CMC tool 608 may provide options to archive chat histories, add or remove members, and integrate with external messaging platforms for continued collaboration beyond the conferencing environment.

Referring to FIG. 6B, the server-side sub-group chat software 650 includes tools, such as programs, subprograms, functions, routines, subroutines, operations, and/or the like for enabling sub-group chats in conferences. As shown, the server-side sub-group chat software 650 includes a chat group management tool 652, a notification management tool 654, a relationship data tool 656, a messaging software integration tool 658, and a recording and download tool 660.

The chat group management tool 652 may be configured to process requests from the client-side sub-group chat software 600 for initiating and modifying chat groups. This includes handling requests to create a chat group, add, and remove members. The chat group management tool 652 may also enable the creator (e.g., a host) of a conference to predefine chat groups during the setup of a conference. The creator of the conference can select the chat group members from the list of attendees. Consequently, these predefined groups become immediately accessible upon the commencement of the conference, ensuring streamlined group interaction from the start of the conference. For recurring conferences, these predefined chat groups are preserved and made available with every instance of the conference, facilitating consistent communication channels for participants and simplifying the process of re-establishing subgroup discussions for each meeting iteration.

The notification management tool 654 can be configured for managing read and unread statuses of messages within each sub-group chat. The notification management tool 654 maintains a list of read (and/or unread) statuses with respect to each sub-group associated with a conference and responds to requests for such statuses. As described above, the client-side sub-group chat software 600 may transmit a notification to the notification management tool 654 when a conference participant selects (e.g., enters) a chat group. Additionally, the client-side sub-group chat software 600 may transmit, with respect to a chat group, a request to the notification management tool 654 to identify those members with unread messages in the chat group. The notification management tool 654 responds to the request with a list of the chat group members with unread statuses. Additionally, the notification management tool 654 may receive messages from client devices in association with a chat group and, in turn, transmits those messages to corresponding devices of the other chat group members.

The relationship data tool 656 identifies relationships between conference participants to recommend bulk actions or in response to a bulk action received from the client-side sub-group chat software 600. To illustrate, in response to the bulk action "all from my company," where the company is ACME, the relationship data tool 656 may identify all conference participants that have the @acme.com domain in their email addresses.

The relationship data tool 656 may interface with a relationship software, such as the relationship software 512 of FIG. 5, to obtain or identify a network of relationships among conference participants. The relationship data tool 656 may interface with the relationship management software to identify conference participants that meet a certain criterion. The criterion may be received from the client-side sub-group chat software 600 or may be predefined in the relationship data tool 656. To illustrate, the relationship data tool 656 may transmit a request to the relationship management software to identify the subsets of the conference participants that are within the same departments.

The relationship data tool 656 may obtain conference participant data associated with at least some of the conference participants and analyze these data to identify relationships (e.g., potential groupings). For example, the relationship data tool 656 may identify that five of the conference participants are members of the "Neptune" project. Based on this identification, the relationship data tool 656 enables targeted bulk actions such as "all Neptune project members." As such, at least some of the bulk actions described with respect to the bulk actions tool 606 may be received from the relationship data tool 656.

The messaging software integration tool 658 establishes a connection with a messaging platform, such as the messaging software 514, to extend the reach of sub-group chats beyond the confines of a conference of the conferencing software. This integration allows for the seamless transition of chat groups into continuous, standalone messaging channels, enabling ongoing collaboration and discussion after the conference has concluded. As described above, messaging software integration tool 658 may use APIs to synchronize chat group data-including membership, conversation history, and attachments-between the conferencing software and the messaging platform.

The recording and download tool 660 enables a conference participant to request that the conference be recorded and to later view or download that recording. In response to a recording request, the recording and download tool 660 creates an individualized recording for the participant, which captures the conference's audio and visual content and inclusively compiles chat messages from groups and DMs of which the participant was a member. The recording and download tool 660 can be configured to respect privacy by excluding messages from groups where the participant was not a member from their recording. A recording of messages may be in the form of a text files corresponding to each chat group.

A conference participant may have the capability to share a recording, for instance via a link, with an individual who did not attend the conference (a sharee). The conference participant can specify, and the share link may be accordingly configured to embed, whether the chat messages of the chat groups of which the conference participant was a member are accessible to the sharee, thereby allowing for controlled dissemination of information and ensuring privacy and relevance of shared content.

Figure 7A:
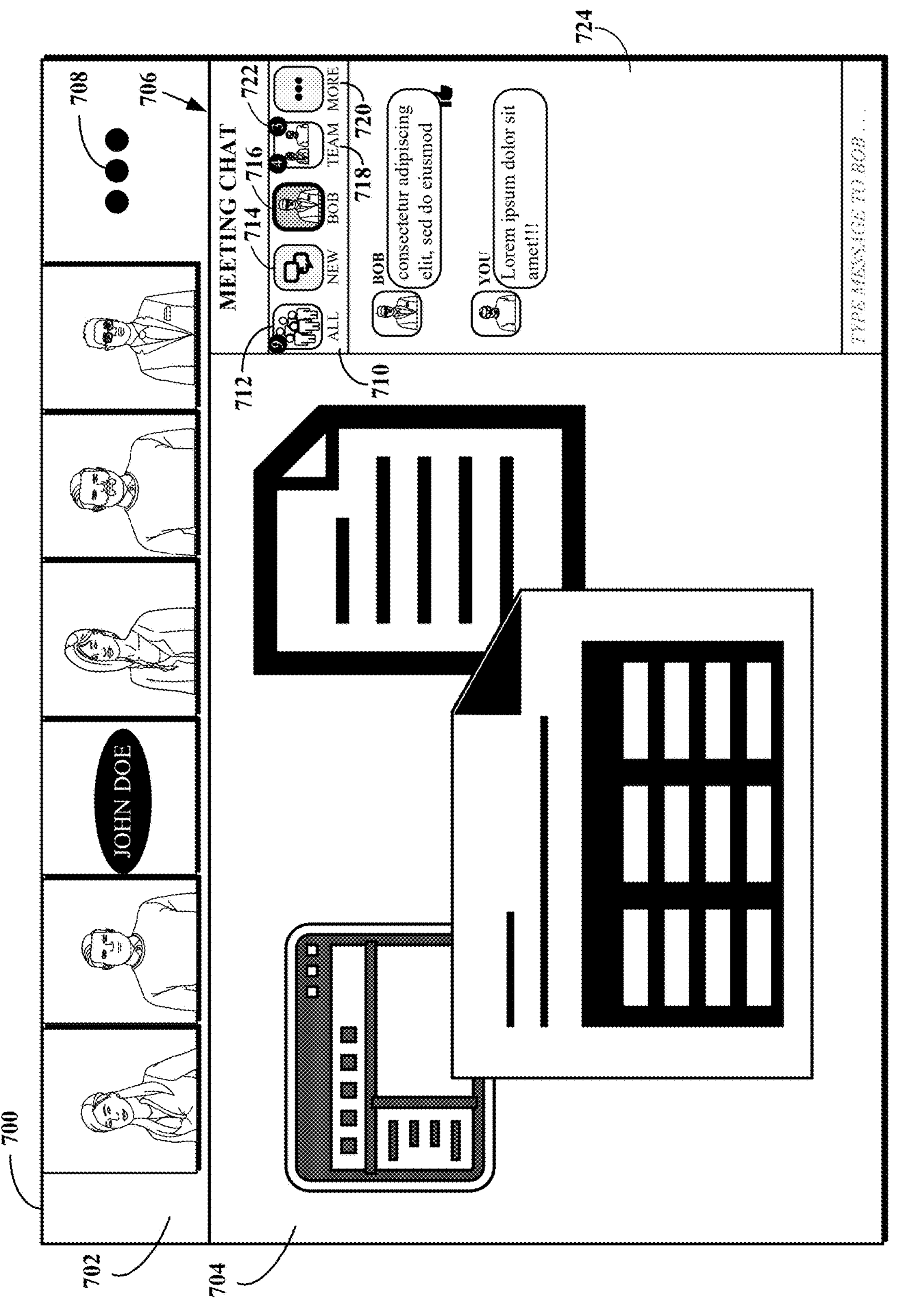
FIGS. 7A-7C illustrate example user interfaces usable with sub-group chats in conferences.
Figures 7B, 7C:
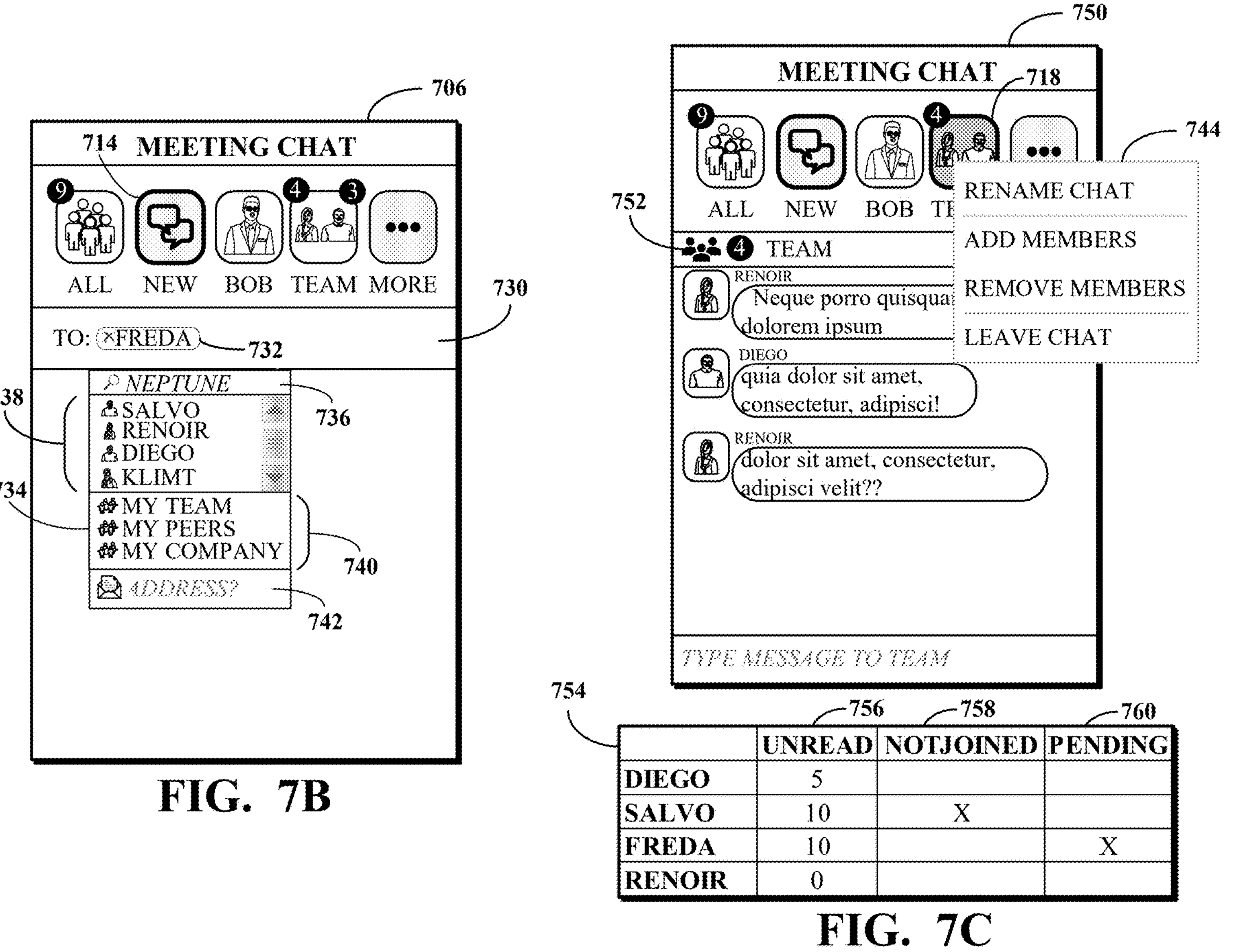

FIGS. 7A-7C illustrate example user interfaces usable with sub-group chats in conferences. While certain controls, functionalities, and layouts are described with respect to FIGS. 7A-7C, the disclosure is not limited to or by them and other controls, functionalities, and layouts are possible.

FIG. 7A illustrates a conferencing user interface 700, configured to facilitate interactive communication among participants in a conference. The user interface 700 can be displayed at the device of a conference participant, such as the client 504 or one of the two or more other clients 506 of FIG. 5. The user interface 700 can be generated (e.g., displayed or rendered) by a client-side sub-group chat software, such as the client-side sub-group chat software 510 or FIG. 5 or the client-side sub-group chat software 600 of FIG. 6A. The user interface 700 is shown as including a gallery area 702, a content area 704, and a chat area 706.

The gallery area 702 includes, for at least some of the conference participants of a video conference, corresponding digital representations. A digital representation of a conference participant may be a label (e.g., a name), an image, a content stream obtained via a camera of the device of the conference participant, or some other digital representation. An ellipsis 708 indicates the presence of additional conference participants beyond those visibly represented in the gallery area 702. The content area 704 illustrates that one of the conference participants has shared content (such as via a screen share) to all conference attendees. If no content is shared to the conference, then the content area 704 may not be displayed.

The chat area 706 functions as the interactive communication hub for the participants. Within this chat area 706, a chat groups management area 710 is configured to enumerate (e.g., list) the currently active communication channels and provides mechanisms for the user to either create new group chats or modify existing ones. Within the chat groups management area 710, several channels are depicted: a general channel 712 for disseminating messages to all conference participants. The general channel 712 may be available by default. That is, no explicit action is required by any of the conference participants to create the general channel 712.

A direct messaging channel 716 illustrates a one-to-one direct messaging channel between the conference participant associated with the conferencing user interface 700 and another conference participant named "BOB." The direct messaging channel 716 may have been created by the conference participant or by the conferencing participant named "BOB." A sub-group chat 718, which is currently composed of four conference participants (as indicated by the adornment on the top-left corner), enables targeted discussions within the subset of the conference participants (e.g., the four selected members).

An action control 714, available in the chat groups management area 710, enables the conference participant to establish new chat groups. Via the action control 714, the conference participant can create additional sub-group chat channels or direct message channels. An action control 720 provides access to additional chat channels created in association with this conference. The available channels accessible to the conference participant via the chat groups management area 710 are those that the conference participants creates or of which the conference participant is a member. Some of the sub-chat groups shown in the chat groups management area 710 may be created by the conference participants themselves and some may have been created by other conference participants who added the conference participant as a member. When a sub-group chat is created and the conference participant is added to that sub-group, that sub-group chat is then displayed in the chat groups management area 710.

To aid in notification management, an adornment 722 is positioned adjacent to a chat channel, indicating the presence of unread messages (in this case, three unread messages), thereby alerting the conference participant to activity within that specific channel. As such, the conference participant can maintain situational awareness of communications across multiple channels without compromising their participation in the ongoing conference. A channel area 724 displays the messages of the currently active channel (e.g., a channel selected by the conference participant). As indicated by the highlighting (e.g., thicker outline and shaded background), the direct messaging channel 716 is currently selected by the conference and the channel area 724 reflects the messages exchanged in the direct messaging channel 716.

FIG. 7B illustrates a user interface for creating a sub-group chat in a conference. FIG. 7B depicts a portion of the conferencing user interface 700 of FIG. 7A. Specifically, FIG. 7B shows the chat area 706 of FIG. 7A, which is the pertinent portion for creating a chat group within a virtual conference environment. The user interface shown in FIG. 7B may be displayed in response to the conference participant invoking (e.g., clicking or selecting) the action control 714 of FIG. 7A.

A members area 730 is usable by the conference participant to add members to the group. FIG. 7B illustrates that a conference participant 732 named "FREDA" has already been selected for addition to the group. A members selector 734 enables the conference participant to select additional conference participants to add to the group. The members selector 734 delineates various predetermined group categories available for rapid chat group formation.

A search field 736 enables the conference participant to provide criteria for identifying conference participants that meet the provided criteria. The criteria can be transmitted to, and are usable by, the relationship data tool 656 of FIG. 6B to identify conference participants that meet the provided criteria. A scrollable list 738 lists all conference participants that have not yet been added to the sub-group and are available for addition to the sub-group chat. That is, the scrollable list 738 lists potential chat group members. The conference participant can select one or more of the listed participants to add to the sub-group chat. A bulk actions list 740 lists defined subsets of participants like 'MY TEAM', 'MY PEERS', and 'MY COMPANY', which can be based on relationship data (e.g., organizational roles, projects, or other relational structures) within the conference's participating entity, as described above.

In a field 742, the conference participant can add one or more identifiers (e.g., email addresses) of individuals who are not currently invitees to the conference. Adding identifiers to the field 742, causes the chat group creation tool 602 (such as via the server-side sub-group chat software 650) to automatically generate and dispatch invitations to those individuals. Each invitation may include a mechanism (e.g., a link) that enables the receiving individual to join the conference and to be automatically added to the group chat. Until an invited individual joins the meeting, a status indicator indicating a "pending" status can be displayed within the chat group to clearly indicate to the other group members that that individual is not currently in the group.

FIG. 7C illustrates a user interface 750 for interacting with a sub-group chat in a conference. The user interface 750 includes a control 752, which when invoked (e.g., clicked), displays a list of the group members. The list of group members can be as shown in a list 754. A contextual menu 744, which may be accessed through a mouse right-click, may include actions for renaming the chat group, adding members (which involves a process akin to that described in FIG. 7B for creating a new chat group), removing members from the group, and an option for a user to leave the group.

The list 754 of the group members indicates the members who have unread messages and may indicate the numbers of unread messages, as shown in a column 756. In a column 758, the list 754 indicates which members, if any, are conference invitees (e.g., the invitee named "SALVO") who have not yet joined the conference and are therefore not yet joined to the group. In a column 760, the list 754 indicates pending members, which are as described with to the field 742 of FIG. 7B.

Figure 8:
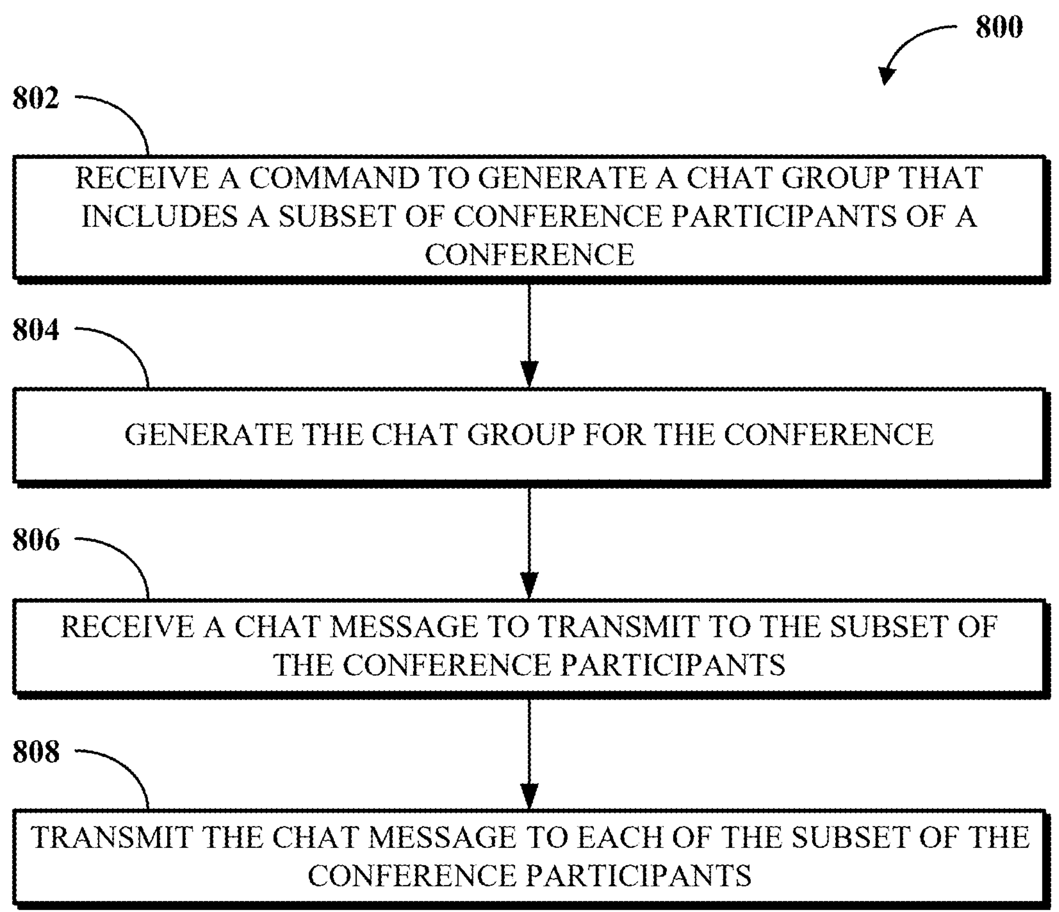
FIG. 8 is a flowchart of an example of a technique for creating and using sub-group chats in a conference.

To further describe some implementations in greater detail, reference is next made to examples of techniques which may be performed by or using a system for enabling sub-group chats in conferences. FIG. 8 is a flowchart of an example of a technique 800 for creating and using sub-group chats in a conference. The technique 800 can be executed using computing devices, such as the systems, hardware, and software described with respect to FIGS. 1-7C. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof. The technique 800 can be implemented by a conferencing software. The conferencing software can be or include one or both of a client-side sub-group chat software or a server-side sub-group chat software. As such, the technique 800 may be implemented in whole or in part by a client-side sub-group chat software or in whole or in part by a server-side sub-group chat software.

At 802, the conferencing software receives a command to generate a chat group for a conference. The command includes a subset of conference participants of the conference. The subset is a proper subset and includes more than one participant. That is, the subset includes less than all of the conference participants of the conference and is not a DM with only one participant. The command may be initiated through a user interface element, such as a button or dropdown menu, displayed within the conferencing software.

The conference participant creating the chat group may provide an identifier (e.g., a name or a topic) to associate with the chat group. In an example, the subset of the conference participants can be based on relationship data. The relationship data may be obtained from a relationship software. In an example, the conferencing software enables an addition, to the subset of the conference participants, an invited but not yet joined conference participant. The conferencing software may provide a user interface mechanism to add or remove participants from the chat group post-creation of the chat group. In an example, an invited, but not yet joined conference participant, can be added to the subset of the conference participants.

At 804, the conferencing software generates the chat group for the conference. The user interface may provide visual confirmation of this action, for instance by displaying the newly created chat group in a distinct area (e.g., the chat groups management area 710 of FIG. 7A) or with a special icon.

A visual indication of the chat group may be provided within the conferencing software that distinguishes the chat group from other communication channels available within the conference. For example, as shown with respect to the sub-group chat 718 of FIGS. 7A and 7C, an icon that includes the digital representations of some of the group members may indicate that this is a sub-group chat. Other visual indications are possible. For example, the chat group's name or background may be color-coded to reflect its unique status. For example, a specific shape or border may be added around the group's chat window or icon. For example, a badge with a number indicating the number of participants in the group may be used, which could be dynamically updated as members are added or removed. For example, an avatar or a picture can be used to represent the group's purpose or the nature of its members. For example, a unique text style or font for the chat group's name may be used. For example, a hover effect over the group name or icon, such as a brief animation or color change, can indicate that the group is a sub-group chat. For example, a tag or keyword, visible through a small icon or text snippet next to the group name, can be attached to a sub-group chat indicating essentially that the chat channel is a "sub-group" chat.

At 806, the conferencing software receives a chat message intended for transmission to the selected subset of the conference participants. The user interface may include a text input area within the chat group's dedicated window or pane, facilitating the entry and sending of messages, aligning with claim 15 of the non-transitory computer readable media.

At 808, the software transmits the received chat message to each member of the identified subset of the conference participants. The user interface may display the sent message within the chat group's conversation thread and may include indications of message delivery and read receipts.

Without instructions to the contrary, the conferencing software may delete the chat group at the conclusion of the conference. In some implementations, the chat group may be converted into a permanent group chat channel accessible via a messaging software after a conclusion of the conference. In an example, a transcript of chat messages within the chat group may be stored in association with a recording of the conference. In an example, a request to generate a recording of the conference may be received from a conference participant not included in the chat group. The messages exchanged in the chat group are excluded from (e.g., not included in) the recording.

In an example, and as described with respect to FIG. 7B, an identifier of an individual who is not invited to the conference may be received. An invitation is transmitted to that individual. The invitation includes a mechanism (e.g., a link) that enables the individual to request joining the conference. Then, in response to receiving a request from that individual to join the conference, the individual is added to the chat group in addition to being joined to the conference. In an example, one of the subset of the conference participants may be removed from the chat group based on a request received from the one of the subset of the conference participants to be removed from the chat group. For example, the request may be received in response to the conference participant selecting the action "LEAVE CHAT," shown in FIG. 7C.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method includes receiving, by a conferencing software, a command to generate a chat group for a conference that includes a subset of conference participants of the conference. The method also includes generating, by the conferencing software, the chat group for the conference. The method also includes receiving, by the conferencing software, a chat message to transmit to the subset of the conference participants. The method also includes transmitting, by the conferencing software, the chat message to each of the subset of the conference participants.

Implementations may include one or more of the following features.

The method may include receiving, by the conferencing software, a selection of the subset of the conference participants.

The method may include providing, by the conferencing software, a visual indication within the conferencing software that distinguishes the chat group from other communication channels available within the conference.

The method may include receiving, by the conferencing software, an identifier to associate with the chat group.

The method may include deleting, by the conferencing software, the chat group after a conclusion of the conference.

The method may include storing, by the conferencing software, a transcript of chat messages within the chat group in association with a recording of the conference.

The method may include converting, by the conferencing software, the chat group into a permanent group chat channel accessible via a messaging software after a conclusion of the conference.

One general aspect includes a system. The system includes one or more memories and one or more processors. The one or more processors are configured to execute instructions stored in the one or more memories to receive, by a conferencing software, a command to generate a chat group for a conference that includes a subset of conference participants of the conference; generate, by the conferencing software, the chat group for the conference; receive, by the conferencing software, a chat message to transmit to the subset of the conference participants; and transmit, by the conferencing software, the chat message to each of the subset of the conference participants.

Implementations may include one or more of the following features.

The system where the command to generate the chat group may be initiated through a user interface element displayed within the conferencing software.

The subset of the conference participants can be based on relationship data.

The one or more processors may be configured to execute instructions stored in the one or more memories to enable an addition, to the subset of the conference participants, an invited but not yet joined conference participant.

The one or more processors may be configured to execute instructions stored in the one or more memories to receive an identifier of an individual who is not invited to the conference; and in response to receiving a request from the individual to join the conference, add the individual to the chat group.

The one or more processors may be configured to execute instructions stored in the one or more memories to identify the subset of the conference participants based on relationship data.

One general aspect includes one or more non-transitory computer readable media storing instructions operable to cause one or more processors to perform operations. The operations include receiving, by a conferencing software, a command to generate a chat group for a conference that includes a subset of conference participants of the conference. The operations also include generating, by the conferencing software, the chat group for the conference. The operations also include receiving, by the conferencing software, a chat message to transmit to the subset of the conference participants. The operations also include transmitting, by the conferencing software, the chat message to each of the subset of the conference participants.

Implementations may include one or more of the following features.

The one or more non-transitory computer readable media where the command to create the chat group may be initiated through a user interface element displayed within the conferencing software and includes the subset of the conference participants.

The operations may include receiving a request to generate a recording of the conference from a conference participant not included in the chat group; and excluding messages exchanged in the chat group from the recording.

The operations may include removing one of the subset of the conference participants from the chat group based on a request received from the one of the subset of the conference participants to be removed from the chat group.

The operations may include providing a user interface mechanism to add or remove participants from the chat group post-creation of the chat group.

The subset of the conference participants may be based on relationship data obtained from a relationship software.

The operations may include adding, to the subset of the conference participants, an invited but not yet joined conference participant.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random-access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively, or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, by a conferencing software while a conference is active, a command to generate a chat group associated with the conference and includes a subset of conference participants of the conference;

generating, by the conferencing software, the chat group for the conference;

receiving, by the conferencing software, a chat message to transmit to the subset of the conference participants;

transmitting, by the conferencing software, the chat message to each of the subset of the conference participants; and converting, by the conferencing software, the chat group into a permanent group chat channel accessible via a messaging software after a conclusion of the conference.

2. The method of claim 1, further comprising:

receiving, by the conferencing software, a selection of the subset of the conference participants.

3. The method of claim 1, further comprising:

providing, by the conferencing software, a visual indication within the conferencing software that distinguishes the chat group from other communication channels available within the conference.

4. The method of claim 1, further comprising:

receiving, by the conferencing software, an identifier to associate with the chat group.

5. The method of claim 1, further comprising:

deleting, by the conferencing software, the chat group after a conclusion of the conference.

6. The method of claim 1, further comprising:

storing, by the conferencing software, a transcript of chat messages within the chat group in association with a recording of the conference.

7. The method of claim 1, wherein converting the chat group into the permanent group chat channel comprises:

transferring a membership and a message history of the chat group to the permanent group chat channel.

8. A system, comprising:

one or more memories; and one or more processors, the one or more processors configured to execute instructions stored in the one or more memories to:

receive, by a conferencing software while a conference is active, a command to generate a chat group associated with the conference and includes a subset of conference participants of the conference;

generate, by the conferencing software, the chat group for the conference;

receive, by the conferencing software, a chat message to transmit to the subset of the conference participants;

transmit, by the conferencing software, the chat message to each of the subset of the conference participants; and convert, by the conferencing software, the chat group into a permanent group chat channel accessible via a messaging software after a conclusion of the conference.

9. The system of claim 8, wherein the command to generate the chat group is initiated through a user interface element displayed within the conferencing software.

10. The system of claim 8, wherein the subset of the conference participants is based on relationship data.

11. The system of claim 8, wherein the one or more processors are further configured to execute instructions stored in the one or more memories to:

enable an addition, to the subset of the conference participants, an invited but not yet joined conference participant.

12. The system of claim 8, wherein the one or more processors are further configured to execute instructions stored in the one or more memories to:

receive an identifier of an individual who is not invited to the conference; and in response to receiving a request from the individual to join the conference, add the individual to the chat group.

13. The system of claim 8, wherein the one or more processors are further configured to execute instructions stored in the one or more memories to:

identify the subset of the conference participants based on relationship data.

14. One or more non-transitory computer readable media storing instructions operable to cause one or more processors to perform operations comprising:

receiving, by a conferencing software while a conference is active, a command to generate a chat group associated with the conference and includes a subset of conference participants of the conference;

generating, by the conferencing software, the chat group for the conference;

receiving, by the conferencing software, a chat message to transmit to the subset of the conference participants;

transmitting, by the conferencing software, the chat message to each of the subset of the conference participants; and converting, by the conferencing software, the chat group into a permanent group chat channel accessible via a messaging software after a conclusion of the conference.

15. The one or more non-transitory computer readable media of claim 14, wherein the command to create the chat group is initiated through a user interface element displayed within the conferencing software and includes the subset of the conference participants.

16. The one or more non-transitory computer readable media of claim 14, wherein the operations further comprise:

receiving a request to generate a recording of the conference from a conference participant not included in the chat group; and excluding messages exchanged in the chat group from the recording.

17. The one or more non-transitory computer readable media of claim 14, wherein the operations further comprise:

removing one of the subset of the conference participants from the chat group based on a request received from the one of the subset of the conference participants to be removed from the chat group.

18. The one or more non-transitory computer readable media of claim 14, wherein the operations further comprise:

providing a user interface mechanism to add or remove participants from the chat group after creation of the chat group.

19. The one or more non-transitory computer readable media of claim 14, wherein the subset of the conference participants is based on relationship data obtained from a relationship software.

20. The one or more non-transitory computer readable media of claim 14, wherein the operations further comprise:

adding, to the subset of the conference participants, an invited but not yet joined conference participant.

* * * * *